(12) United States Patent
Weiss et al.

(10) Patent No.: US 8,821,615 B2
(45) Date of Patent: Sep. 2, 2014

(54) SOUR GAS TREATMENT PROCESS

(75) Inventors: Claire Weiss, Vaucresson (FR); Renaud Cadours, Francheville (FR); Kamal Bouzalmata, Nogent-sur-Oise (FR)

(73) Assignee: Total S.A., Courbevoie (FR)

( * ) Notice: Subject to any disclaimer, the term of this patent is extended or adjusted under 35 U.S.C. 154(b) by 278 days.

(21) Appl. No.: 13/380,351

(22) PCT Filed: Jun. 25, 2010

(86) PCT No.: PCT/IB2010/052905
§ 371 (c)(1), (2), (4) Date: Jun. 12, 2012

(87) PCT Pub. No.: WO2010/150227
PCT Pub. Date: Dec. 29, 2010

(65) Prior Publication Data
US 2012/0240617 A1 Sep. 27, 2012

(30) Foreign Application Priority Data

Jun. 26, 2009 (FR) ...................................... 09 03117

(51) Int. Cl.
*B01D 53/14* (2006.01)
*B01D 53/52* (2006.01)
*C10L 3/10* (2006.01)
*C01B 17/04* (2006.01)

(52) U.S. Cl.
CPC ........ *B01D 53/1425* (2013.01); *B01D 2257/80* (2013.01); *B01D 53/526* (2013.01); *B01D 53/1462* (2013.01); *B01D 2256/24* (2013.01); *C10L 3/10* (2013.01); *C10L 3/102* (2013.01); *B01D 2257/504* (2013.01); *C01B 17/0408* (2013.01); *B01D 2258/06* (2013.01)
USPC ................... 95/173; 62/611; 62/625; 95/174; 95/179; 95/181; 95/183; 95/193; 95/199; 95/209; 95/223; 95/227; 95/228; 95/235; 95/236; 96/234; 96/242

(58) Field of Classification Search
USPC .......... 95/235, 206, 187; 62/611, 625; 203/42
See application file for complete search history.

(56) References Cited

U.S. PATENT DOCUMENTS

| | | | |
|---|---|---|---|
| 3,492,788 A | | 2/1970 | Hochgesand et al. |
| 4,276,057 A | * | 6/1981 | Becker et al. ................... 95/174 |
| 4,293,322 A | | 10/1981 | Ryan et al. |
| 4,299,891 A | | 11/1981 | Mocas |

(Continued)

*Primary Examiner* — Duane Smith
*Assistant Examiner* — Cabrena Holecek
(74) *Attorney, Agent, or Firm* — Harness, Dickey & Pierce, P.L.C.

(57) ABSTRACT

The disclosure relates to a process for treating a gas mixture containing carbon dioxide and hydrogen sulphide, including the following steps: deacidificating the gas mixture by bringing the gas mixture into contact with a first lean absorbent solution stream, delivering a deacidified gas mixture, and a first rich absorbent solution stream; regenerating the first rich absorbent solution stream, delivering the first lean absorbent solution stream and a sour gas stream; distillating the sour gas stream, delivering a first carbon-dioxide-rich stream and a hydrogen-sulphide-rich stream; purifying the first carbon-dioxide-rich stream by bringing the first carbon-dioxide-rich stream into contact with a second lean absorbent solution stream, delivering a second carbon-dioxide-rich stream and a second rich absorbent solution stream, the molar concentration of carbon dioxide in the second carbon-dioxide-rich stream being greater than the molar concentration of carbon dioxide in the first carbon-dioxide-rich stream. The disclosure also relates to an installation designed to implement this process.

18 Claims, 1 Drawing Sheet

(56) References Cited

U.S. PATENT DOCUMENTS

| | | |
|---|---|---|
| 4,345,918 A | 8/1982 | Meissner |
| 4,370,156 A * | 1/1983 | Goddin et al. .......... 62/625 |
| 5,382,354 A | 1/1995 | Ansquer et al. |
| 7,128,276 B2 | 10/2006 | Nilsen et al. |
| 2006/0239879 A1 | 10/2006 | Lallemand et al. |
| 2007/0144943 A1 | 6/2007 | Lemaire et al. |
| 2008/0187485 A1 | 8/2008 | Magne-Drisch et al. |
| 2009/0213687 A1 | 8/2009 | Linga et al. |
| 2010/0083696 A1 | 4/2010 | Hoang-Dinh et al. |
| 2010/0154637 A1 | 6/2010 | Capedeville |

* cited by examiner

SOUR GAS TREATMENT PROCESS

FIELD OF THE INVENTION

The present invention relates to a method for purifying a gas mixture (in particular a gas mixture based on hydrocarbons such as natural gas) containing sour gases, as well as to a suitable installation for applying this process.

TECHNICAL BACKGROUND

Within the scope of the production of natural gas (mainly containing methane) or of liquefied natural gas, it is necessary to purify said natural gas stemming from a deposit, from a certain number of contaminants, at the first rank of which are what are called <<sour gases>>, i.e. mainly carbon dioxide (CO2) and hydrogen sulfide ($H_2S$), with possibly mercaptans, carbonyl sulfide and/or carbon disulfide, generally in smaller amounts.

Carbon dioxide and hydrogen sulfide themselves alone may represent a significant portion of the gas mixture stemming from a natural gas deposit, typically from 3 to 70% (in molar concentration).

Many methods presently exist for de-acidifying natural gas.

A first class of methods is that of physical absorption methods, wherein the sour gases are put into contact with an absorbent solution, the transfer of the sour gases into the absorbent solution being effected by affinity. Examples of compounds which may form such suitable absorbent solutions are polyethylene glycol dimethylether (SELEXOL® method of UOP), propylene carbonate (a process from Fluor Corporation), N-methyl-pyrrolidone (PURISOL® process from Lurgi), methanol (RECTISOL® process from Lurgi) or morpholine derivatives (MORPHISORB® process from UHDE). Regeneration of the absorbent solution is carried out by successive expansions at decreasing pressures, without providing energy.

A second class of methods is that of chemical absorption processes wherein the sour gases are put into contact with an absorbent solution, the transfer of the sour gases into the absorbent solution being effected or accelerated by a chemical reaction. Examples of compounds which may form such suitable absorbent solutions are potassium carbonate (BENFIELD® process of UOP) and especially alkanolamines: notably monoethanolamine (MEA), 2-aminoethoxyethanol also known as diglycolamine (DGA), diisopropanolamine (DIPA), diethanolamine (DEA), methyldiethanolamine (MDEA), activated methyldiethanolamine and triethanolamine (TEA), as well as sterically hindered amines. Regeneration of the absorbent solution is mainly carried out in a thermal regeneration column.

Mention may also be made of a class of mixed methods with physico-chemical absorption, such as for the so-called SULFINOL® process of Shell, in which the absorbent solution is a mixture of sulfolane, water and an amine. Reference may also be made to the physico-chemical absorption process by means of a mixture of alkanolamine, water and thioalkanol which is described in document WO 2007/083012.

Conventionally, the sour gases released during the regeneration of the absorbent solution feed a Claus unit, wherein $H_2S$ is converted into sulfur but where the associated $CO_2$ may be considered as a contaminant which causes a significant overcost in the treatment of $H_2S$. Moreover, increasing environmental constraints tend to more and more impose that the produced $CO_2$ not be released into the atmosphere. For example, it is desirable to be able to use the produced $CO_2$ for improving the recovery of hydrocarbon oils (Enhanced Oil Recovery or EOR), i.e. reinjection under pressure into wells.

It is therefore desirable to have available sour gases produced in the form of two relatively pure fractions, one containing $H_2S$ and the other one $CO_2$.

In order to perform a separation between $H_2S$ and $CO_2$, the use of a distillation column is known. Document U.S. Pat. No. 4,293,322 proposes an $H_2S/CO_2$ distillation example by means of a third body. However, if a high degree of purity is desired for each of the two gases, it is necessary to use a piece of equipment with a large volume, costly and having a substantial consumption of energy.

An alternative method for separating sour gases is proposed in document WO 2008/107550. In this document, regeneration of the absorbent solution is carried out in several stages with decreasing pressure, the gases being recompressed and reinjected from the lower stages to the upper stages. Diversion of a portion of the gases at the stage with the lowest pressure provides an $H_2S$-rich stream, while a $CO_2$-rich stream is recovered at the outlet of the stage with the highest pressure. However, this method is especially effective when the ratio of the $CO_2$ molar concentration over the $H_2S$ molar concentration is high. On the other hand, when this ratio is low, selectivity of the separation strongly decreases, i.e. the $CO_2$ stream contains a significant proportion of $H_2S$ (of the order of 20% when the ratio of $CO_2/H_2S$ concentrations is less than 1).

Therefore there exists a need for a method for purifying a gas mixture containing sour gases which allows production of a $CO_2$ stream and of an $H_2S$ stream separately, with a high degree of purity, said method being simpler to apply and/or consuming less energy and/or being less costly than existing processes.

In particular there exists a need for such a method when the ratio of the $CO_2$ molar concentration over the $H_2S$ molar concentration in the gas mixture to be treated is low, and is notably less than or equal to 1.

SUMMARY OF THE INVENTION

The invention firstly relates to a method for treating a gas mixture containing carbon dioxide and hydrogen sulfide, comprising the following steps:
  deacidification of the gas mixture by bringing said gas mixture into contact with a first lean absorbent solution stream, providing a deacidified gas mixture and a first rich absorbent solution stream;
  regeneration of the first rich absorbent solution, delivering the first lean absorbent solution stream and a stream of sour gases;
  distillation of the sour gas stream, delivering a first carbon-dioxide-rich stream and a hydrogen-sulfide-rich stream;
  purification of the first carbon-dioxide-rich stream by putting said first carbon-dioxide-rich stream in contact with a second lean absorbent solution stream, providing a second carbon-dioxide-rich stream and a second rich absorbent solution stream, the carbon dioxide molar concentration in the second carbon-dioxide-rich stream being greater than the carbon dioxide molar concentration in the first carbon-dioxide-rich stream According to an embodiment, the first lean absorbent solution stream and the second lean absorbent solution stream have the same composition.

According to an embodiment:
  the regeneration step also comprises regeneration of the second rich absorbent solution stream, said regeneration step delivering the first lean absorbent solution stream and the second lean absorbent solution stream; or the deacidification step also comprises bringing the gas mixture into contact with the second rich absorbent solution stream, delivering the deacidified gas mixture and the first rich absorbent solution stream.

According to an embodiment, the gas mixture containing carbon dioxide and hydrogen sulfide is based on hydrocarbons, and is preferably natural gas.

According to an embodiment, the molar concentration ratio between carbon dioxide and hydrogen sulfide in the gas mixture comprising carbon dioxide and hydrogen sulfide is less than or equal to 1, preferably less than or equal to 0.75 and ideally less than or equal to 0.5.

According to an embodiment, the carbon dioxide molar concentration in the first carbon-dioxide-rich stream is comprised between 80 and 99%, preferably between 85 and 98%, most preferably between 90 and 97%, and ideally between 93 and 96%.

According to an embodiment:
the carbon dioxide concentration in the hydrogen-sulfide-rich stream is less than or equal to 5,000 ppmv, preferably less than or equal to 2,000 ppmv, most preferably less than or equal to 200 ppmv; and/or
the hydrogen sulfide concentration in the second carbon-dioxide-rich stream is less than or equal to 5,000 ppmv, preferably less than or equal to 1,000 ppmv, most preferably less than or equal to 200 ppmv.

According to an embodiment, the aforementioned method further comprises the step:
dehydration of the deacidified gas mixture.

According to an embodiment, the aforementioned method does not comprise any step for dehydrating the sour gas stream by means of molecular sieves or any contact with a solvent, prior to the distillation step.

The invention also relates to an installation for treating a gas mixture containing sour gases, comprising:
a conduit for supplying a gas mixture;
a first conduit for supplying lean absorbent solution;
an absorption column, fed by the gas mixture supply conduit and by the first lean absorbent solution supply conduit;
a conduit for drawing off deacidified gas mixture stemming from the absorption column;
a first conduit for drawing off a rich absorbent solution stemming from the absorption column;
a regenerator, fed by the first conduit for drawing off rich absorbent solution;
a conduit for drawing off a lean absorbent solution stemming from the regenerator;
a conduit for drawing off sour gases stemming from the regenerator;
a distillation unit, fed by the conduit for drawing off sour gases;
a conduit for drawing off a hydrogen-sulfide-rich stream stemming from the distillation unit;
a first conduit for drawing off a carbon-dioxide-rich stream stemming from the distillation unit;
a second conduit for supplying lean absorbent solution;
a contactor fed by the first conduit for drawing off a carbon-dioxide-rich stream and by the second conduit for supplying lean absorbent solution;
a second conduit for drawing off a carbon-dioxide-rich stream stemming from the contactor; and
a second conduit for drawing off rich absorbent solution stemming from the contactor.

According to an embodiment, the first conduit for supplying lean absorbent solution and the second conduit for supplying lean absorbent solution stem from a same tank of lean absorbent solution.

According to an embodiment:
the second conduit for drawing off a rich absorbent solution feeds the regenerator; or
the second conduit for drawing off a rich absorbent solution feeds the absorption column.

According to an embodiment, the contactor is an absorption column or preferably an injection mixer or a static mixer.

According to an embodiment, the aforementioned installation is without any unit for dehydration by a solvent or by a molecular sieve between the regenerator and the distillation unit.

According to an embodiment, the aforementioned method is applied in the aforementioned installation.

The invention also relates to a method for producing liquefied natural gas, comprising:
treatment of a natural gas containing sour gases, according to the aforementioned method; and
liquefaction of the treated natural gas.

With the present invention it is possible to overcome the drawbacks of the state of the art. More particularly it provides a method for purifying a gas mixture containing sour gases allowing production of a $CO_2$ stream and of an $H_2S$ stream separately, with a high degree of purity, said method being simpler to apply and/or consuming less energy and/or being less costly than existing processes.

This is accomplished by separation of the sour gases in two steps, with distillation in a first step and washing of the $CO_2$ stream with an absorbent solution in a second step. In this way, the distillation of the first step does not need to be used to the maximum extent, since a finishing treatment is provided in the second step. The method according to the invention is therefore less energy-consuming, less costly and requires a piece of equipment which is less bulky.

It is particularly advantageous to apply this method when the ratio of the $CO_2$ molar concentration over the $H_2S$ molar concentration in the gas mixture to be treated is low, and is notably less than or equal to 1, since in this case selective separation by staged regeneration does not allow production of a sufficiently pure $CO_2$ stream.

According to certain particular embodiments, the invention also has one or preferably several of the advantageous features listed below.

Washing of the $CO_2$ stream may be carried out with the same absorbent solution as for the main gas mixture, by using the same regeneration circuit, which limits the number and bulk of the additional pieces of equipment to be provided.

Because $H_2S/CO_2$ distillation is not used to the maximum extent, the distillation unit is relatively tolerant to the presence of water. Therefore, and unlike the state of the art, it may be unnecessary to provide a specific step for dehydration of the sour gases between the regeneration of the absorbent solution and the distillation. This represents a considerable simplification, in so far that the dehydration of sour gases requires bulky and complex equipment (typically molecular sieves which are difficult to regenerate when the treated gas stream is a mixture of $H_2S$ and $CO_2$).

DESCRIPTION OF EMBODIMENTS OF THE INVENTION

The invention is now described in more detail and in a non-limiting way in the following description.
Gas Treatment Installation In the following, the terms of <<upstream>> and <<downstream>> are defined with respect to the transport direction of the different fluids in the installation.

Figure 1:
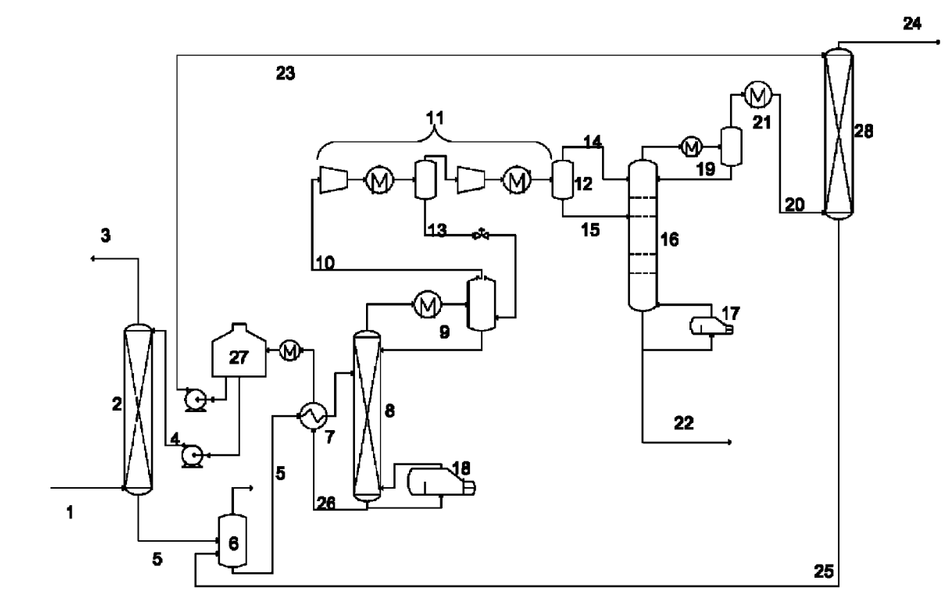
FIG. 1 schematically illustrates an embodiment of the installation for treating a gas mixture according to the invention.

With reference to FIG. 1, a gas treatment installation according to the invention comprises at least one absorption column 2, and at least one regenerator 8.

The absorption column 2 may be a customary column in this field, notably a plate column or a packed column, the installation may also comprise two or more absorption columns.

The regenerator 8 is a contactor. It may consist in a simple container provided with means for spraying an absorbent solution or preferably, in a plate column (or in a packed column). As an example, the regenerator 8 may include from 10 to 30 actual plates.

The absorption column 2 is fed at the bottom by a conduit for supplying a gas mixture 1. A conduit for drawing off a deacidified gas mixture 3 is connected at the outlet at the head of the absorption column 2. It may feed complementary treatment means (notably dehydration means) or gas storage or transport means which are not shown here.

At the head of the absorption column 2 at the inlet a first conduit is connected for supplying a lean absorbent solution 4. A first conduit for drawing off a rich absorbent solution 5 is connected at the outlet of the bottom of the absorption column 2.

This first conduit for drawing off a rich absorbent solution 5 feeds the head of the regenerator 8. On this first conduit for drawing off a rich absorbent solution 5, a decompression system 6 is provided in order to recover the co-absorbed hydrocarbons in the absorption column 2.

The regenerator 8 is provided with a heating means 18 at the bottom (generally called a re-boiler) and at the head a reflux system 9 (provided with a condenser), in a standard way. At the head of the regenerator 8 at the outlet a conduit is connected for drawing off sour gases 10. At the bottom of the regenerator 8 at the outlet a conduit 26 is connected for drawing off a lean absorbent solution which feeds a lean absorbent solution tank 27. It is at the outlet of the lean absorbent solution tank 27 where the first lean absorbent solution supply conduit 4 is connected, which feeds the absorption column 2.

A heat exchanger 7 allows heat exchange between the first conduit for drawing off a rich absorbent solution 5 and the conduit for drawing off a lean absorbent solution 26. An additional heat exchanger may also be provided for controlling the temperature of the lean absorbent solution.

On the conduit for drawing off sour gases 10, provision is made for a compression system 11. The compression system 11 may comprise a compressor or a succession of compressors or compressor stages, (for example two on the illustrated diagram, or optionally three), a cooler being provided at the outlet of each compressor or compressor stage. When the compression system 11 comprises at least two compressors, a separation flask is also provided between the successive compressors. The head of each separation flask then feeds the next compressor, while a conduit for recycling condensates 13 is provided at the bottom of each separation flask and in return feeds the reflux system 9 of the regenerator 8.

According to an embodiment, downstream from the compression system 11, the conduit for drawing off sour gases 10 feeds a separation flask 12. At the head of the separation flask 12, are connected a conduit for drawing off a gas phase 14 and a conduit for drawing off a liquid phase 15. Both of these conduits feed a distillation unit 16 at different levels, the conduit for drawing off a gas phase 14 feeding the distillation unit 16 above the conduit for drawing off a liquid phase 15. Alternatively, it is possible to do without the separation flask 12, in which case the conduit for drawing off sour gases 10 feeds the distillation unit 16 at a single level.

According to an embodiment (not shown), a dehydration unit is provided on the conduit for drawing off sour gases 10 upstream from the distillation unit 16. This may notably be a molecular sieve device or a device for washing with a solvent, both known in the field.

However according to a preferred embodiment, there is no specific dehydration unit positioned on the conduit for drawing off sour gases 10 upstream from the distillation unit 16. By specific dehydration unit is meant a unit dedicated to dehydration, notably a device with molecular sieve(s) or a device for washing with a solvent. However it is understood that the presence of conduit(s) for recycling condensates 13 necessarily leads to some dehydration but cannot be considered as the presence of a specific dehydration unit.

The distillation unit 16 is preferably in the form of a column comprising liquid/vapor contact devices such as plates or packing. As compared with the state of the art in which the gases $CO_2$ and $H_2S$ are exclusively separated by means of a distillation unit, the distillation parameters are less demanding according to the present invention. Therefore, it is possible to reduce the energy consumption of the distillation unit (as compared with the state of the art) and/or to reduce the volume of the equipment of the distillation unit 16 (in particular, reduce the number of plates and/or the diameter of the column).

Generally, the volume of the equipment is adapted to the targeted operating conditions. According to an embodiment, the distillation unit 16 comprises a number of plates comprised between 25 and 35 theoretical plates.

The distillation unit 16 is provided with a heating means 17 at the bottom (generally called a re-boiler) and a reflux system 19 at the head (provided with a condenser) in a standard way. At the head of the distillation unit 16, at the outlet, a first conduit 20 is connected for drawing off a carbon-dioxide-rich stream. At the bottom of the distillation unit 16, at the outlet, a conduit 22 is connected for drawing off a hydrogen-sulfide-rich stream.

The first conduit for drawing off a carbon-dioxide-rich stream 20, after passing through a cooler 21, feeds a contactor 28. The contactor 28 is also fed by a second conduit for supplying a lean absorbent solution 23.

The contactor 28 may be an absorption column of the same type as the absorption column 2 described above. In this case, the first conduit for drawing off a carbon-dioxide-rich stream 20 feeds the contactor 28 at the bottom and the second conduit for supplying a lean absorbent solution 23 feeds the contactor 28 at the head. The contactor 28 then ensures a counter-current contact between the liquid phase and the gas phase.

But according to a preferred embodiment, the contactor 28 is rather an injection mixer. An injection mixer is a mixer which ensures mixing of a liquid phase and of a gas phase in a co-current mode typically by dispersing droplets of liquid phase in the gas phase.

For example, the injection mixer may be a vortex mixer comprising liquid phase supply means positioned as a ring at the periphery of a gas phase transport conduit, and adapted so as to disperse liquid phase droplets into the gas phase by a Venturi effect (or nozzle effect), before again separating immediately the liquid phase and the gas phase.

Documents WO 02/00334 and WO 2006/038810 provide examples of suitable injection mixers within the scope of the invention. Propure manufactures such suitable injection mixers.

The contactor 28 may also be a static mixer, ensuring the mixing of the liquid phase and of the gas phase, both of these phases being then separated by means of a separator flask. Sulzer manufactures such suitable static mixers.

At the outlet of the contactor 28, are provided a second conduit for drawing off a carbon-dioxide-rich stream 24 (at the head if the contactor 28 is an absorption column) and a second conduit for drawing off a rich absorbent solution 25 (at the bottom if the contactor 28 is an absorption column).

According to an embodiment, the installation comprises a single absorbent solution circuit, i.e. the second lean absorbent solution supply conduit 23 stems from the lean absorbent solution tank 27 which also feeds the absorption column 2 via the first lean absorbent solution supply conduit 4.

In this case, the second conduit for drawing off a rich absorbent solution 25 in return feeds the regenerator 8 via the decompression system 6. According to an alternative embodiment, this second conduit for drawing off a rich absorbent solution 25 feeds the absorption column 2 together with the first lean absorbent solution supply conduit 4 (which corresponds to the case when the absorbent solution in the second conduit for drawing off a rich absorbent solution 25 is semi-lean).

It is quite understood that the installation according to the invention is described here only according to its guideline, that additional elements required for its proper operation (heat exchangers, valves, pumps, etc.) may be added thereto and variations may be provided with respect to this guideline without altering the substance thereof: presence of several absorption columns 2 and/or several regenerators 8, etc.

A Method for Treating a Gas Mixture Comprising Sour Gases

With the invention it is possible to treat gas mixtures, notably natural gas. The description which follows is established in connection with natural gas, but another type of gas mixture containing sour gases may also be treated by the method of the invention. For example the method of the invention allows the treatment of fumes, or further sour gases from hydrodesulphurization of petroleum cuts (such as gasolines or gas oils) in a refinery.

Natural gas contains sour gases, in particular hydrogen sulfide and carbon dioxide. Natural gas may also contain carbonyl sulfide, mercaptans and/or carbon disulfide. With the method according to the invention it is possible to considerably reduce the hydrogen sulfide and carbon dioxide content of natural gas, and possibly the content of other sour gases in natural gas.

Preferably, the molar ratio of the carbon dioxide content relatively to the hydrogen sulfide content in natural gas is less than or equal to 1, preferably less than or equal to 0.75 and ideally less than or equal to 0.5. Indeed, it is when the carbon dioxide is a minority relatively to hydrogen sulfide that the invention is particularly advantageous, for example as compared with a $CO_2/H_2S$ separation system by staged regeneration.

The first step of the method is a step for deacidifying natural gas by putting into contact with an absorbent solution, in its lean form.

An absorbent solution is said to be lean when the absorbent solution is relatively not very loaded with sour gases, and the absorbent solution is said to be rich when the absorbent solution is relatively highly loaded with sour gases.

Unless indicated otherwise, the concentrations stated in the present description are given in molar percentages.

Natural gas, after the deacidification step by putting into contact with the absorbent solution, may subsequently be dehydrated. It is then optionally available for distribution in the natural gas network. Moreover, natural gas after deacidification and dehydration may undergo subsequent treatments with view to its liquefaction by which it is possible to obtain liquefied natural gas.

The absorbent solution used within the scope of the invention may be a chemical, physical or physico-chemical absorption solution. Preferably this is a chemical or physico-chemical absorption solution. All the absorbent solutions known for their capability of absorbing sour gases mixed with hydrocarbons may be used.

Preferably, the absorbent solution is a solution based on an amine, notably alkanolamine. As such, alkonalamine may notably be selected from the group formed by monoethanolamine (MEA), 2-aminoethoxyethanol also known as diglycolamine (DGA), diisopropanolamine (DIPA), diethanolamine (DEA), methyldiethanolamine (MDEA), activated methyldiethanolamine (for example enriched with hydroxyethylpiperazine or piperazine), triethanolamine (TEA), sterically hindered amines and mixtures thereof.

Preferably, the alkanolamine is mixed with water and optionally with a physical solvent.

Any known physical solvent is suitable for this purpose, and notably sulfolane. Thus, according to a particular embodiment, the absorbent solution comprises a mixture of DIPA, water and sulfolane or MDEA, water and sulfolane.

Another type of particularly advantageous physical solvent is formed by $C_2$-$C_4$ thioalkanols of formula R—S—$C_{2-4}$—OH wherein R is any group, for example an alkyl group or an alcohol group or a thiol group or an alkylthioalkanol group, the group notably containing up to 6 carbon atoms. Thiodiglycol (TDG) is a more preferred physical solvent. This is the compound of formula $S(CH_2-CH_2-OH)_2$. In addition to TDG, other $C_2$-$C_4$ thioalkanols may be used according to the invention, notably methylthioethanol or further dimer molecules and notably ethylene-dithioethanol, of formula (HO—$CH_2-CH_2$)—S—($CH_2-CH_2$)—S—($CH_2-CH_2$—OH).

In this respect reference is made here to document WO 2007/083012.

According to a first preferred embodiment, the absorbent solution comprises:
  about 20 to about 60% by mass of diethanolamine; and
  about 40 to about 80% by mass of water.

According to a second preferred embodiment, the absorbent solution comprises:
  about 20 to about 60% by mass of methyldiethanolamine; and
  about 40 to about 80% by mass of water.

According to a third preferred embodiment, the absorbent solution comprises:
  about 20 to about 60% by mass of activated methyldiethanolamine; and
  about 40 to about 80% by mass of water.

According to a fourth more preferred embodiment, the absorbent solution comprises:
- about 20 to about 60% by mass of diethanolamine;
- about 20 to about 60% by mass of water; and
- about 10 to about 40% by mass of thiodiethylene glycol;

or, more advantageously:
- about 30 to about 45% by mass of diethanolamine;
- about 30 to about 50% by mass of water; and
- about 15 to about 30% by mass of thiodiethylene glycol; or, even more advantageously:
- about 40% by mass of diethanolamine;
- about 40% by mass of water; and
- about 20% by mass of thiodiethylene glycol.

According to a fifth more preferred embodiment, the absorbent solution comprises:
- about 20 to about 60% by mass of methyldiethanolamine;
- about 20 to about 60% by mass of water; and
- about 10 to about 40% by mass of thiodiethylene glycol.

According to a sixth more preferred embodiment, the absorbent solution comprises:
- about 20 to about 60% by mass of activated methyldiethanolamine;
- about 20 to about 60% by mass of water; and
- about 10 to about 40% by mass of thiodiethylene glycol.

The use of the thioalkanol co-solvent and more particularly TDG is advantageous since with it, it is possible to remove a significant portion of the mercaptans contained in the gas mixture to be treated, simultaneously with removal of $CO_2$ and $H_2S$.

The natural gas to be treated, flowing upwards in the absorption column 2, is put into contact with the downward flowing (lean) absorbent solution. The absorbent solution absorbs the majority of the sour gases, and the treated natural gas is recovered.

The temperature in the absorption column 2 is typically comprised between about 20 and about 100° C., preferably between about 40 and about 90° C. The pressure in the column is for example comprised between 1 and 150 bars gauge (barg), preferably between 40 and 100 barg. The operation is carried out at a gas mixture flow rate typically comprised between $0.2 \times 10^6$ Nm³/day and $20 \times 10^6$ Nm³/day and at an absorbent solution flow rate typically comprised between 5 and 1,500 m³/hour.

The thereby treated (deacidified) natural gas then undergoes other subsequent treatment steps, for example a dehydration step optionally followed by a cooling and liquefaction step for producing liquefied natural gas.

The absorbent solution loaded with sour gases or rich absorbent solution is moreover regenerated in the regenerator 8 after preliminary decompression.

Said preliminary expansion optionally comprises flash decompression of the absorbent solution within a flash decompression flask. At the end of this flash decompression, the absorbent solution is at a temperature comprised between 30° C. and 90° C., and at a pressure comprised between 5 barg and 30 barg. The flashed gases are recovered by a simple effect of the pressure difference. These flashed gases may be treated downstream notably for recovering a possible fraction of hydrocarbons contained in these flashed gases, in addition to the sour gases.

Next the absorbent solution enters the regenerator 8, which for example operates at a pressure comprised between 1 and 3 barg. The temperature is preferably as high as possible while being less than the chemical and thermal degradation temperature of the absorbent solution. For example, this temperature may be comprised between 110° C. and 135° C., preferably it may be about 130° C.

The preceding temperature and pressure values are valid for conventional amine-based absorbent solutions.

At the outlet of the regenerator 8, a stream of sour gases is recovered in the conduit for drawing off sour gases 10 (mainly containing carbon dioxide and hydrogen sulfide) on the one hand, a lean absorbent solution stream is recovered on the other hand in the conduit for drawing off a lean absorbent solution 26. The lean absorbent solution is (at least partly) recycled towards the deacidification step for the natural gas.

The stream of sour gases is then compressed in the compression system 11 and sent to the distillation unit 16 so as to be subject to distillation separating $CO_2$ from $H_2S$. The compression of the sour gases may be carried out in one or several steps, preferably several steps, notably two or three steps. In this case, after each compression step, the stream is cooled and the condensates are separated which are returned to the regenerator 8. The condensates first comprise water. Therefore, the compression of the stream of acid gases in several steps ensures de facto some dehydration of the stream of sour gases.

Before entering the distillation unit 16, the stream of sour gases is typically at a temperature comprised between 10° C. and 60° C., preferably between 25° C. and 40° C., and at a pressure comprised between 10 and 50 barg, preferably between 20 and 30 barg. Generally, under these conditions, this stream of sour gases in reality comprises a gas phase and a liquid phase. The separation of this gas phase and of this liquid phase prior to the distillation step is optional and advantageous, indeed, the composition of both phases is different (the gas phase is richer in $CO_2$ than the liquid phase), and the efficiency of the method is therefore optimized when each of the two phases is injected into the distillation unit 16 at which the $CO_2$ and $H_2S$ composition is approximately the same as that of the relevant phase.

Distillation ensures a first separation of $CO_2$ and $H_2S$ from the stream of sour gases. Preferably this distillation is a simple distillation, which does not involve any third body. The distillation unit 16 is proportioned so that, and the operating parameters of the distillation are set so that:
- the hydrogen-sulfide-rich stream, which is recovered at the bottom of the distillation unit 16 is very pure, i.e. it has a purity of more than 99%, i.e. this stream contains less than 1%, preferably less than 5,000 ppmv, most preferably less than 2,000 ppmv, ideally less than 200 ppmv of carbon dioxide; and
- the carbon-dioxide-rich stream (called the first carbon-dioxide-rich stream), which is recovered at the head of the distillation unit 16, is relatively pure, i.e. comprises between 80 and 99%, preferably between 85 and 98%, most preferably between 90 and 97% and ideally between 93 and 96% of carbon dioxide.

Indeed, the distillation unit 16 is proportioned so that, and the operating parameters of the distillation are set so that the distillation is not be used to the maximum extent as regards the first carbon dioxide stream, given that a subsequent step for purifying the first carbon dioxide stream is provided.

This gives the possibility of avoiding having to apply a too complex, restrictive and/or costly distillation.

Further, the presence of a relative large amount of hydrogen sulfide in the whole of the distillation unit 16, including in the reflux system 19, gives the possibility of considerably limiting the risks of formation of hydrates in the distillation unit 16. Therefore, according to a preferred embodiment, it is unnecessary to provide a specific step for dehydration of the stream of sour gases before distillation (in particular on molecular sieves or by washing with solvent), the dehydration necessarily performed during the compression of the sour gases then proving to be sufficient considering the parameters of the distillation.

This scenario is particularly advantageous as compared with the $H_2S/CO_2$ distillations practiced in the state of the art, for which extensive preliminary dehydration is often necessary, which proves to be very restrictive.

On the other hand, if the water content of the compressed stream of sour gases is however too large with respect to the specifications of the distillation unit 16, it is naturally always possible to provide such a preliminary dehydration step, for example on molecular sieve(s) or by washing with a solvent (typically triethylene glycol).

The first carbon-dioxide-rich stream undergoes a subsequent purification step by its putting into contact with a second lean absorbent solution stream within the contactor 28.

The second lean absorbent solution stream must be an absorbent solution stream having better affinity for hydrogen sulfide than for carbon dioxide, which is notably the case with an absorbent solution based on MDEA or activated MDEA, and to a certain extent with a solution based on DEA, or further with an absorbent solution based on a DEA/TDG or MDEA/TDG or activated MDEA/TDG mixture.

It is particularly advantageous if the absorbent solution is the same for the deacidification of natural gas and for the contacting with the first carbon-dioxide-rich stream, since this method is then particularly simplified. A single absorbent solution circuit may then actually be provided, and the same lean absorbent solution tank 27 may provide the first and the second lean absorbent solution stream, for absorbing sour gases and for purifying the first carbon-dioxide-rich stream, respectively.

The second rich absorbent solution stream which stems from the step for purification of the first carbon-dioxide-rich stream, may be mixed with the first rich absorbent solution stream and undergo the same regeneration step. Alternatively, if the absorbent solution of the second rich absorbent solution stream may be considered as semi-lean, this second rich absorbent solution stream may be recycled towards the step for deacidification of the natural gas and absorb sour gases together with the first lean absorbent solution stream.

It is particularly advantageous if the contactor 28 is an injection mixer as defined above. Indeed, the contacting between the carbon-dioxide-rich stream and the second lean absorbent solution stream is in this case effective (the exchange surface area between both streams being very large) but also very rapid, i.e. the dwelling time (and the contact time) of both streams is short. Thus, absorption having the faster kinetics (absorption of hydrogen sulfide) is all the more promoted with respect to the absorption having the slowest kinetics (i.e. absorption of carbon dioxide); the selectivity of the absorption of hydrogen sulfide by the absorbent solution is therefore promoted.

As an example, it is possible to achieve contact between the first carbon-dioxide-rich stream and the second lean absorbent solution stream with the following parameters: pressure comprised between 5 and 30 barg, and temperature comprised between 20 and 60° C.

At the end of this step for purifying the carbon-dioxide-rich stream, the second rich absorbent solution stream (mainly loaded with hydrogen sulfide) is therefore recovered, as well as a second carbon-dioxide-rich stream, purer than the first.

The second carbon-dioxide-rich stream preferably has a purity of more than 99%, i.e. this stream contains less than 1%, preferably less than 5,000 ppmv, most preferably between 10 ppmv and 1,000 ppmv, ideally less than 200 ppmv, of hydrogen sulfide.

The hydrogen-sulfide-rich stream is for example directed towards a Claus unit for producing sulfur, while the second carbon-dioxide-rich stream is for example used for the purposes of improving recovery of hydrocarbon oils (EOR), i.e. reinjection under pressure in the wells.

EXAMPLES

The following examples illustrate the invention without limiting it.

Example 1

An installation and a method for treating natural gas according to the state of the art are considered in this example, by focusing on the $H_2S/CO_2$ selective separation aspect of the installation and of the method. An absorbent solution comprising 53% by weight of water and 47% by weight of MDEA is used.

Carbon dioxide and hydrogen sulfide are separated in sour gases exclusively by distillation. The sour gases comprise 66% of $H_2S$, 33% of $CO_2$, 0.3% of $CH_4$, the balance being formed by impurities. The gas is saturated with water under these pressure and temperature conditions.

At the outlet of the regenerator, the sour gases are at a pressure of 2 barg and at a temperature of 40° C., with a water content of 3.7 mol %. The sour gas flow rate is 290 kmol/h. The sour gases stemming from the regenerator are compressed up to a gauge pressure of 28 barg and sent into a distillation unit at a temperature of 31° C.

The distillation unit is provided so as to produce at the head a stream containing 99.9% of $CO_2$ and 100 ppm of $H_2S$, and at the bottom a stream containing 200 ppmv of $CO_2$ and 99.9% of $H_2S$.

The distillation column includes 30 theoretical plates and is operated at a head pressure of 27 barg. The temperature of the condenser is −9° C.

Considering these specifications, it is preferable to provide a specific dehydration step for the sour gases before the distillation step in order to avoid formation of hydrates in the distillation unit.

According to numerical simulations, the consumption of the main energy expenditure items is established as follows:

Power of the system for compressing the sour gases upstream from the distillation: 831 kW.
Power of the condensation system at the head of the distillation unit: 916 kW.
Power of the heating system at the bottom of the distillation unit: 1.64 MW.
Heating power for the dehydration unit: 0.1 MW.
Total mechanical power used: 1747 kW.
Total thermal power used: 1.74 MW.
Total mechanical power used converted into <<fuel gas>> equivalent: 17,809 $Sm^3/d$.
Total thermal power used converted into <<fuel gas>> equivalent: 4,928 $Sm^3/d$.
Total power used converted into <<fuel gas>> equivalent: 22,737 $Sm^3/d$.

Example 2

This example is identical with Example 1 to within the following differences.

The distillation unit is provided so as to produce at the head a stream containing 95.3% of $CO_2$ and 4.7% of $H_2S$, and at the bottom a stream containing 200 ppm by moles of $CO_2$ and 99.9% of $H_2S$.

The distillation column contains 30 theoretical plates and is operated at a head pressure of 27 barg. The temperature of the condenser is −9° C.

Considering the specifications of the distillation unit, it is unnecessary to provide a specific step for dehydrating the sour gases before the distillation step to avoid formation of hydrates in the distillation unit.

After the distillation step, the $CO_2$-rich head stream undergoes an additional purification step, by bringing it into contact with the same absorbent solution which is used for deacidifying the natural gas. This contacting is carried out within an absorption column. This purification is adjusted so as to recover a final $CO_2$ stream containing 99.9% of $CO_2$ and 100 ppm of $H_2S$, just like in Example 1.

The absorption column allowing contact with a solvent flow rate of 18 Sm3/h includes 12 effective plates.

According to numerical simulations, the consumption of the main energy expenditure items is established as follows:
Power of the system for compressing the sour gases upstream from the distillation: 887 kW.
Power of the condensation system at the head of the distillation unit: 715 kW.
Power of the heating system at the bottom of the distillation unit: 1.07 MW.
Additional power for pumping an absorbent solution: 10 kW.
Additional heating power during regeneration of the absorbent solution: 1 MW.
Additional condensation power during regeneration of the absorbent solution (reflux): 5 kW.
Total mechanical power used: 1,617 kW.
Total thermal power used: 2.07 MW.
Total mechanical power used converted into <<fuel gas>> equivalent: 16,484 $Sm^3/d$.
Total thermal power used converted into <<fuel gas>> equivalent: 5,862 $Sm^3/d$.
Total power used converted into <<fuel gas>> equivalent: 22,346 $Sm^3/d$.

It is therefore observed that with Example 2 (according to the invention) it is possible to simplify the installation and method as compared with the state of the art (Example 1) by doing without optional dehydration of the sour gases prior to distillation. Thus, the provision of a device with molecular sieves, which is particularly cumbersome and complex to apply (notably because of the requirement of treating the regeneration gas) is avoided. Further, the gas and liquid flow rates inside the column are lower than those of Example 1, a reduction which allows reduction in the diameter of the column and in the dimensions of the associated pieces of equipment. Finally an overall energy gain of 1.7% is obtained during operation.

Example 3

This example is identical with Example 2 with the only difference being that the purification of the $CO_2$-rich stream is carried out in an injection mixer, which allows more selective absorption of $H_2S$, as compared with the absorption column used in Example 2.

The injection mixer is a mixer commercially available under the name of ProCAP®.

According to numerical simulations, the consumption of the main energy expenditure items is established as follows:
Power of the system for compressing the sour gases upstream from the distillation: 850 kW.
Power of the condensation system at the head of the distillation unit: 702 kW.
Power of the heating system at the bottom of the distillation unit: 1.05 MW.
Additional power for pumping an absorbent solution: 10 kW.
Additional heating power during regeneration of the absorbent solution: 0.5 MW.
Additional condensation power during regeneration of the absorbent solution (reflux): 5 kW.
Total mechanical power used: 1,567 kW.
Total thermal power used: 1.55 MW.
Total mechanical power used converted into <<fuel gas>> equivalent: 15,974 Sm3/d.
Total thermal power used converted into <<fuel gas>> equivalent: 4,930 Sm3/d.
Total power used converted into <<fuel gas>> equivalent: 20,364 $Sm^3/d$.

It is therefore observed that with Example 3 (according to the invention) it is possible to simplify the installation and the method as compared with the state of the art (Example 1) by doing without optional dehydration of the sour gases prior to distillation. Further, the gas and liquid flow rates inside the column are also lower than those of Example 1, a reduction which also allows a reduction in the diameter of the column and in the dimensions of the associated pieces of equipment. Finally, this embodiment also gives the possibility of obtaining an energy gain of 10.4% during operation.

The invention claimed is:

1. A method for treating a gas mixture containing carbon dioxide and hydrogen sulfide, comprising the following steps:
    deacidifying the gas mixture by putting the gas mixture in contact with a first lean absorbent solution stream, delivering a deacidified gas mixture and a first rich absorbent solution stream;
    regenerating the first rich absorbent solution, delivering the first lean absorbent solution stream and a stream of sour gases;
    distilling the stream of sour gases, delivering a first carbon-dioxide-rich stream and a rich-hydrogen-sulfide stream; and
    purifying the first carbon-dioxide-rich stream by putting the first carbon-dioxide-rich stream in contact with a second lean absorbent solution stream, delivering a second carbon-dioxide-rich stream and a second rich absorbent solution stream, the molar concentration of carbon dioxide in the second carbon-dioxide-rich stream being greater than a molar concentration of carbon dioxide in the first carbon-dioxide-rich stream; and
    wherein the first lean absorbent solution stream and the second lean absorbent solution stream have the same composition.

2. The method according to claim 1, wherein:
    the regeneration step also comprises regenerating the second rich absorbent solution stream, the regeneration step delivering the first lean absorbent solution stream and the second lean absorbent solution stream; or
    the deacidification step also comprises the putting of the gas mixture in contact with the second rich absorbent solution stream, delivering the deacidified gas mixture and the first rich absorbent solution stream.

3. The method according to claim 1, wherein the gas mixture containing carbon dioxide and hydrogen sulfide is based on hydrocarbons, and is natural gas.

4. The method according to claim 1, wherein the molar concentration ratio between carbon dioxide and hydrogen sulfide in the gas mixture comprising carbon dioxide and hydrogen sulfide is less than or equal to 1.

5. The method according to claim 1, wherein the molar concentration of carbon dioxide in the first carbon-dioxide-rich stream is comprised between 80 and 99%.

6. The method according to claim 1, wherein at least one of:
the carbon dioxide concentration in the hydrogen-sulfide-rich stream is less than or equal to 5,000 ppmv; and
the hydrogen sulfide concentration in the second carbon-dioxide-rich stream is less than or equal to 5,000 ppmv.

7. The method according to claim 1, further comprising: dehydrating the deacidified gas mixture.

8. The method according to claim 1, not comprising any step for dehydrating the stream of sour gases by means of a molecular sieve or by contact with a solvent, prior to the distillation step.

9. An installation for treating a gas mixture containing sour gases, comprising:
a conduit for supplying a gas mixture;
a first conduit for supplying a lean absorbent solution;
an absorption column, fed by the gas mixture supply conduit and by the first lean absorbent solution supply conduit;
a conduit for drawing off a deacidified gas mixture stemming from the absorption column;
a first conduit for drawing off a rich absorbent solution stemming from the absorption column;
a regenerator, fed by the first conduit for drawing of a rich absorbent solution;
a conduit for drawing off a lean absorbent solution stemming from the regenerator;
a conduit for drawing off sour gases stemming from the regenerator;
a distillation unit fed by the conduit for drawing off sour gases;
a conduit for drawing off a hydrogen-sulfide-rich stream stemming from the distillation unit;
a first conduit for drawing off a carbon-dioxide-rich stream stemming from the distillation unit;
a second lean absorbent solution supply conduit;
a contactor fed by the first conduit for drawing off a carbon-dioxide-rich stream and by the second lean absorbent solution supply conduit;
a second conduit for drawing off a carbon-dioxide-rich stream stemming from the contactor; and
a second conduit for drawing off a second rich absorbent solution stemming from the contactor; and
wherein the first lean absorbent solution supply conduit and the second lean absorbent solution supply conduit stem from a same tank of lean absorbent solution.

10. The installation according to claim 9, wherein:
the second conduit for drawing off a rich absorbent solution feeds the regenerator; or
the second conduit for drawing off a rich absorbent solution feeds the absorption column.

11. The installation according to claim 9, wherein the contactor is an absorption column or an injection mixer or a static mixer.

12. The installation according to claim 9, which is without any unit for dehydration by a solvent or by a molecular sieve between the regenerator and the distillation unit.

13. The method according to claim 1, applied in an installation comprising:
a conduit for supplying a gas mixture;
a first conduit for supplying a lean absorbent solution;
an absorption column, fed by the gas mixture supply conduit and by the first lean absorbent solution supply conduit;
a conduit for drawing off a deacidified gas mixture stemming from the absorption column;
a first conduit for drawing off a rich absorbent solution stemming from the absorption column;
a regenerator, fed by the first conduit for drawing off a rich absorbent solution;
a conduit for drawing off a lean absorbent solution stemming from the regenerator;
a conduit for drawing off sour gases stemming from the regenerator;
a distillation unit fed by the conduit for drawing off sour gases;
a conduit for drawing off a hydrogen-sulfide-rich stream stemming from the distillation unit;
a first conduit for drawing off a carbon-dioxide-rich stream stemming from the distillation unit;
a second lean absorbent solution supply conduit;
a contactor fed by the first conduit for drawing off a carbon-dioxide-rich stream and by the second lean absorbent solution supply conduit;
a second conduit for drawing off a carbon-dioxide-rich stream stemming from the contactor;
a second conduit for drawing off a second rich absorbent solution stemming from the contactor; and
wherein the first lean absorbent solution supply conduit and the second lean absorbent solution apply conduit stem from a same tank of lean absorbent solution.

14. A method for producing liquefied natural gas, comprising:
(a) the treatment of natural gas containing sour gases comprising:
deacidifying the gas mixture by putting the gas mixture in contact with a first lean absorbent solution stream, delivering a deacidified gas mixture and a first rich absorbent solution stream;
regenerating the first rich absorbent solution, delivering the first lean absorbent solution stream and a stream of sour gases;
distilling the stream of sour gases, delivering a first carbon-dioxide-rich stream and a rich-hydrogen-sulfide stream; and
purifying the first carbon-dioxide-rich stream by putting the first carbon-dioxide-rich stream in contact with a second lean absorbent solution stream, delivering a second carbon-dioxide-rich stream and a second rich absorbent solution stream, the molar concentration of carbon dioxide in the second carbon-dioxide-rich stream being greater than a molar concentration of carbon dioxide in the first carbon-dioxide-rich stream;
wherein the first lean absorbent solution stream and the second lean absorbent solution stream have the same composition; and
(b) liquefying the natural gas into liquefied natural gas.

15. The method according to claim 4, wherein the molar concentration ratio between carbon dioxide and hydrogen sulfide in the gas mixture comprising carbon dioxide and hydrogen sulfide is less than or equal to 0.75.

16. The method according to claim 15, wherein the molar concentration ratio between carbon dioxide and hydrogen sulfide in the gas mixture comprising carbon dioxide and hydrogen sulfide is less than or equal to 0.5.

17. The method according to claim 5, wherein the molar concentration of carbon dioxide in the first carbon-dioxide-rich stream is comprised between 85 and 98%.

18. The method according to claim 6, wherein:
the carbon dioxide concentration in the hydrogen-sulfide-rich stream is less than or equal to 2,000 ppmv; and
the hydrogen sulfide concentration in the second carbon-dioxide-rich stream is less than or equal to 1,000 ppmv.

* * * * *